United States Patent
Cao

(10) Patent No.: US 6,337,755 B1
(45) Date of Patent: Jan. 8, 2002

(54) POLARIZATION INDEPENDENT ALL-OPTICAL REGENERATORS

(75) Inventor: Xiang-Dong Cao, Boynton Beach, FL (US)

(73) Assignee: Qtera Corporation, Boca Raton, FL (US)

( * ) Notice: Subject to any disclaimer, the term of this patent is extended or adjusted under 35 U.S.C. 154(b) by 0 days.

(21) Appl. No.: 09/193,753

(22) Filed: Nov. 17, 1998

(51) Int. Cl.[7] .............................................. H04B 10/02
(52) U.S. Cl. ....................... 359/176; 359/124; 359/179; 385/1
(58) Field of Search ............................... 359/124, 158, 359/174, 176, 179; 385/1–3

(56) References Cited

U.S. PATENT DOCUMENTS

| | | | |
|---|---|---|---|
| 5,109,441 A | * 4/1992 | Glaab | 385/1 |
| 5,708,734 A | * 1/1998 | Van Der Tol | 385/11 |
| 5,911,015 A | * 6/1999 | Bigo | 385/1 |
| 5,930,412 A | * 7/1999 | Toussaere | 385/3 |
| 5,959,753 A | * 9/1999 | Duling, III et al. | 359/158 |
| 6,148,122 A | * 11/2000 | Cao et al. | 385/1 |

FOREIGN PATENT DOCUMENTS

EP        99282     * 1/1984

OTHER PUBLICATIONS

Nakazawa et al, "160 Gbit/s WDM (20 Gbit/s = 8 channels) soliton transmission over 10000 km using inline synchronous modulation and optical filtering", Electronics Letters, vol. 34, No. 1, pp. 103–104, Jan. 1998.*

Article entitled "10 Gbit/s Single–pass Soliton Transmission Over 1000 km" by M. Nakazawa, *Electronic Letters*, vol. 27, No. 14, pp. 1289–1291, Jul. 4, 1991.

Article entitled "Experimental Demonstration Of Soliton Data Transmission Over Unlimited Distances" by M. Nakazawa, *Electronic Letters*, vol. 29, No. 9, pp. 729–730, Apr. 29, 1993.

Article entitled "Soliton Transmission Control In Time And Frequency Domains" by M. Nakazawa, *IEEE Journal of Quantum Electronics*, vol. 29, No. 7, pp. 2189–2197, Jul., 1993.

Article entitled "20 GBit/s Optically Regenerated Transmission over 40 Mm Based On Polarization–independent, Push–pull InP Mach–Zehnder Modulator" by P. Brindel et al., *ECOC '98*, p. 685, (1998).#jf139##

Primary Examiner—Thomas Mullen
(74) Attorney, Agent, or Firm—Hunton & Williams

(57) ABSTRACT

In an all-optical regenerator, an optical input signal having N wavelength division multiplexed (WDM) channel signals is demultiplexed and each channel signal is directed onto a separate optical path. In each optical path a clock recovery arrangement is responsive to the associated optical channel signal for generating an electrical clock signal having a frequency corresponding to a bit rate frequency of the optical channel signal. The electrical clock signal is used to generate at least one electrical driving voltage signal. An optical amplitude/phase modulator, including at least three electrodes and first and second Lithium niobate optical waveguides, is responsive to both the optical channel signal and the at least one electrical driving voltage signal for generating an optical output channel signal which is polarization independent. A cross splice/delay line arrangement interconnects a second end of the first Lithium niobate optical waveguide to a first end of the second Lithium niobate optical waveguide with first and second polarization maintaining optical fibers, respectively, for introducing a predetermined rotation of TE and TM modes so that polarization components at the second end of the second Lithium niobate optical waveguide experience a same amount of phase modulation. The outputs from the modulators in the N optical paths are multiplexed to generate a WDM channel output signal from the regenerator.

12 Claims, 3 Drawing Sheets

POLARIZATION INDEPENDENT ALL-OPTICAL REGENERATORS

CROSS REFERENCE TO RELATED APPLICATIONS

This invention is related to the following application which is assigned to the assignee of the present invention, has a common inventor, and is being filed concurrently: U.S. patent application Ser. No. 09/193,752 (Qtera 2), entitled "High Speed Polarization Independent Modulators Using Lithium Niobate Waveguides" now U.S. Pat. No. 6,148,122

FIELD OF THE INVENTION

The present invention relates to synchronous polarization independent all-optical regenerators which include polarization independent modulators for use in, for example, high-speed, long haul, transmissions, and especially in high-speed soliton transmissions.

BACKGROUND OF THE INVENTION

All-optical regenerators are expected to be a key element in future high-capacity photonic networks since such regenerators provide many advantages compared to their electronic counterparts. The advantages provided by the all-optical regenerators are, for example, bit rate independence, higher speeds, and lower cost. Several types of all-optical regenerators have been proposed in recent years such as, for example, semiconductor optical amplifier (SOA) based regenerators, nonlinear optical loop mirror (NOLM) based regenerators, and synchronous modulation based regenerators.

Essentially unlimited propagation distance at high bit rate (>10 Gbit/s) has been achieved using the technique of synchronous modulation. In this regard, see, for example, the articles by M. Nakazawa et al. in (a) Electronics Letters, Vol. 27, No. 14, pages 1289–1291, Jul. 4, 1991, entitled "10 Gbit/s Single-Pass Soliton Transmission Over 1000 km" (b) IEEE Journal of Quantum Electronics, Vol. 29, No. 7, pages 2189–2197, July, 1993, entitled "Soliton Transmission Control In Time And Frequency Domains" and (c) Electronics-Letters, Vol. 29, No. 9, pages 729–730, Apr. 29, 1993, entitled "Experimental Demonstration Of Soliton Data Transmission Over Unlimited Distances". A disadvantage of the synchronous modulators that are used is that polarization dependence is a very detrimental limitation for practical applications, other than possibly integrated high-speed transmitters, since endless polarization tracking would be required.

The article by P. Brindel et al. entitled "20 Gbit/s Optically Regenerated Transmission over 40 Mm Based on Polarization-independent, Push-pull InP Mach-Zehnder Modulator", in ECOC '98, pages 685 and 686, September, 1998, discloses a newer type of modulator without polarization dependence. The modulator is a Mach-Zehnder modulator made from InP. However, this type of modulator has a high insertion loss (>20 dB) which makes it difficult to use in practical applications.

It is desirable to provide an all-optical regenerator which includes polarization independent modulators and advantageously has low insertion loss (e.g., <8 dB), a low driving voltage, and can be widely used in high-speed transmissions.

SUMMARY OF THE INVENTION

The present invention is directed to synchronous polarization independent all-optical regenerators which include polarization independent modulators.

Viewed from one aspect, the present invention is directed to an optical regenerator comprising a first optical path for separately processing a demultiplexed optical channel signal of an optical input signal comprising N wavelength division multiplexed channel signals received by the regenerator. The first optical path comprises clock recovery means and an optical modulator. The clock recovery means is responsive to the demultiplexed optical channel signal for generating an electrical recovered clock signal having a frequency corresponding to a bit rate frequency of the demultiplexed optical channel signal. The electrical recovered clock signal is used in the clock recovery means to generate at least one electrical driving voltage signal. The optical modulator comprises at least three electrodes, and first and second Lithium niobate optical waveguides interspersed between the at least three electrodes. The optical modulator is responsive to both the optical channel signal and the at least one electrical driving voltage signal from the clock recovery means for generating a regenerated optical output channel signal which is polarization independent.

Viewed from another aspect, the present invention is directed to an optical regenerator for use in an optical transmission system comprising a wavelength division demultiplexer (WDD), clock recovery means, optical modulators, and a wavelength division multiplexer (WDM). The WDD is responsive to the reception of an optical input signal comprising N wavelength division multiplexed channel signals for directing each channel signal onto a separate one of N optical output paths. A separate clock recovery means is coupled in each of the N optical output paths of the WDD and is responsive to the optical channel signal directed to the associated optical output path by the WDD for generating an electrical recovered clock signal having a frequency corresponding to a bit rate frequency of the optical channel signal. The electrical recovered clock signal is used by the clock recovery means to generate at least one electrical driving voltage signal. A separate optical modulator is coupled in each of the N optical output paths of the WDD comprising at least two electrodes and at least two Lithium niobate optical waveguides, the optical modulator being responsive to both the associated optical channel signal and the at least one electrical driving voltage signal from the associated clock recovery means for generating a regenerated optical output signal which is polarization independent. The wavelength division multiplexer (WDM) is responsive to the reception of each of the regenerated optical output signals from the optical modulators in the N optical paths for generating an optical output signal. The optical output signal comprises N wavelength division multiplexed channel signals for transmission over a single optical output fiber of the regenerator.

The invention will be better understood from the following more detailed description taken with the accompanying drawings and claims.

DETAILED DESCRIPTION

Figure 1:
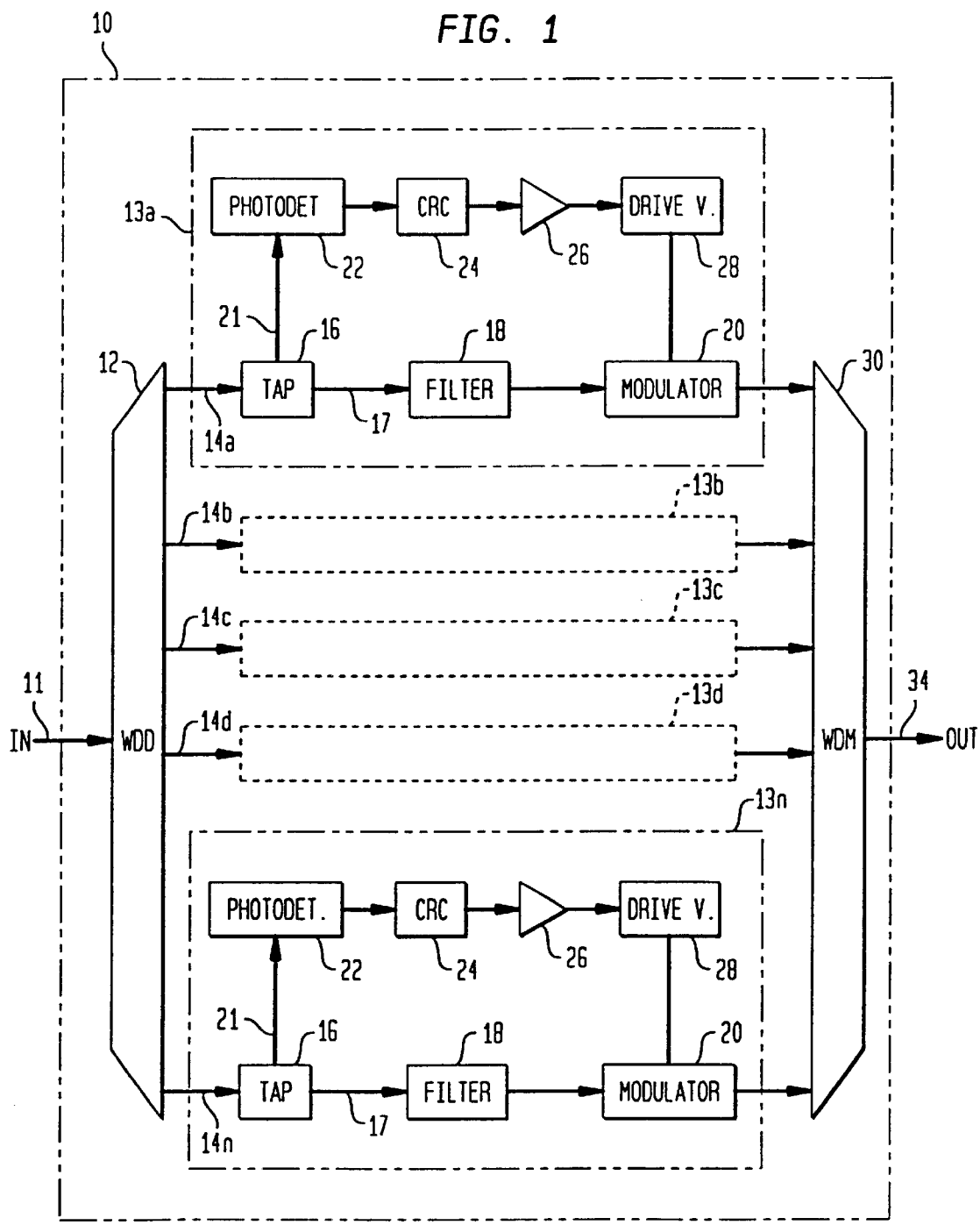
FIG. 1 shows a block diagram of a synchronous all-optical regenerator in accordance with the present invention.

Referring now to FIG. 1, there is shown a block diagram of a synchronous all-optic regenerator 10 (shown within a dashed line rectangle) in accordance with the present invention. The regenerator 10 comprises an optical wavelength division demultiplexer (WDD) 12, a plurality of N optical signal regeneration arrangements 13a–13n (shown within dashed line rectangles) of which only the regeneration arrangements 13a and 13n have their elements shown in block diagram form, and an optical wavelength division multiplexer (WDM) 30. Each of the optical signal regeneration arrangements 13a–13n comprises an optical power tap 16, an optical filter 18, an electro-optic modulator 20, a high-speed photodetector (PHOTODET.) 22, a clock recovery circuit (CRC.) 24, an amplifier 26, and a Driving Voltage (DRIVE V.) circuit 28.

In each of the regeneration arrangements 13a–13n a separate optical path (e.g., 14a, 14b, 14c, 14d, . . . , or 14n) from the WDD 12 is coupled to an input of the associated optical tap 16. The optical tap 16 has first and second optical outputs that are coupled to first and second optical fibers 17 and 21, respectively. The first optical fiber 17 from the optical tap 16 is coupled through the optical filter 18 to a first input of the 10 electro-optic modulator 20. The second optical fiber 21 from the optical tap 16 is coupled to an input of the photodetector 22. The output of the photodetector 22 is coupled to an input of the clock recovery circuit 24, and an output of the clock recovery circuit 24 is coupled to an input of the amplifier 26. An output of the amplifier 26 is coupled to an input of the Driving Voltage circuit 28, and an output of the Driving Voltage circuit 28 is coupled to a second input of the modulator 20. An output of the modulator 20 is coupled to a separate one of N optical inputs to the WDM 30. The combination of the electro-optic modulator 20 and the clock recovery circuit 24 forms the modulator 20 into a synchronous modulator because the modulator is synchronized with the recovered clock signal.

In the operation of the regenerator 10, an optical input signal comprising N wavelength division multiplexed channels is provided via a single mode optical fiber 11 as the input to the WDD 12, where N can comprise any integer ≧2. The WDD 12 is a wavelength division demultiplexer which directs the N wavelength division multiplexed channels along the N separate output optical paths 14a–14n. A first channel of the received wavelength division multiplexed optical signal is directed along optical path 14a to an input of the optical tap 16 of the first regeneration arrangement 13a. Similarly, the second, third, fourth, and Nth channel of the received wavelength division multiplexed optical signal are directed along optical paths 14b, 14c, 14d, and 14n, respectively, to an input of the associated optical tap 16 of the respective second, third, fourth, and Nth regeneration arrangements 13b, 13c, 13d, and 13n. The following description is directed to the operation of the regeneration arrangement 13a only. Each of the remaining regeneration arrangements 13b–13n operates in a corresponding manner on the associated channel signal of the received wavelength division multiplexed optical channel signal which are directed onto paths 14b–14n, respectively.

In the regeneration arrangement 13a, a first output of the optical tap 16 directs a predetermined portion of the received input optical channel signal along optical fiber 17 to an input of the optical filter 18 which provides a passband for only the channel signal being processed by the regeneration arrangement 13a. For example, in regeneration arrangement 13a, the filter 18 is arranged to pass the optical signal of the first channel signal of the N wavelength division multiplexed channels directed by the WDD 12 onto path 14a, and to reject optical signals of any noise and all of the other N-1 channel signals. The optical output signal from filter 18 is provided as a first input to the modulator 20.

A second output of the optical tap 16 directs a remaining portion of the input optical channel signal on path 14a along optical fiber 21 to an input of the high-speed photodetector 22. The photodetector 22 converts the optical input signal from the tap 16 into a corresponding electrical channel signal which is coupled to an input of the clock recovery circuit 24. The clock recovery circuit 24 is responsive to the electrical channel signal from the photodetector 22 for generating an electrical clock signal having a frequency corresponding to the bit rate frequency of the optical channel signal directed by the WDD 12 onto path 14a. The clock recovery circuit 24 also functions to adjust the phase of the clock signal so that the clock signal received at the modulator 20 is in phase with the optical channel signal received by the modulator 20 from the optical filter 18. This is essentially a one-time phase adjustment to compensate for any delays introduced by one or more of the amplifier 26, drive voltage circuit 28, filter 18, and a difference between the the paths 17 and 21 from the optical tap 16 to the modulator 20.

The generated clock signal from the clock recovery circuit 24 is amplified in amplifier 26 to a predetermined amplitude and coupled to an input of the drive voltage circuit 28. The drive voltage circuit 28 is responsive to the amplified clock signal for generating one or more driving voltage signals that drive the modulator 20 in accordance with the present invention. The modulator 20 modulates the amplitude and/or phase of the optical channel pulse stream received from the filter 18 and generates a regenerated optical output signal which is coupled to a separate input of the WDM 30. In the WDM 30, the plurality of N regenerated optical channel signals propagating along paths 14a–14n from the associated modulators 20 in the regeneration arrangements 13a–13n are multiplexed and transmitted as an N wavelength division multiplexed optical output signal over optical fiber 34. The N wavelength division multiplexed optical output signal on optical fiber 34 is generally provided as an input to an optical amplifier (not shown). The optical amplifier is normally an Erbium-doped fiber amplifier (EDFA) which amplifies the N multiplexed optical channel signals to a predetermined amplitude level before being transmitted to a remote location.

Figure 2:
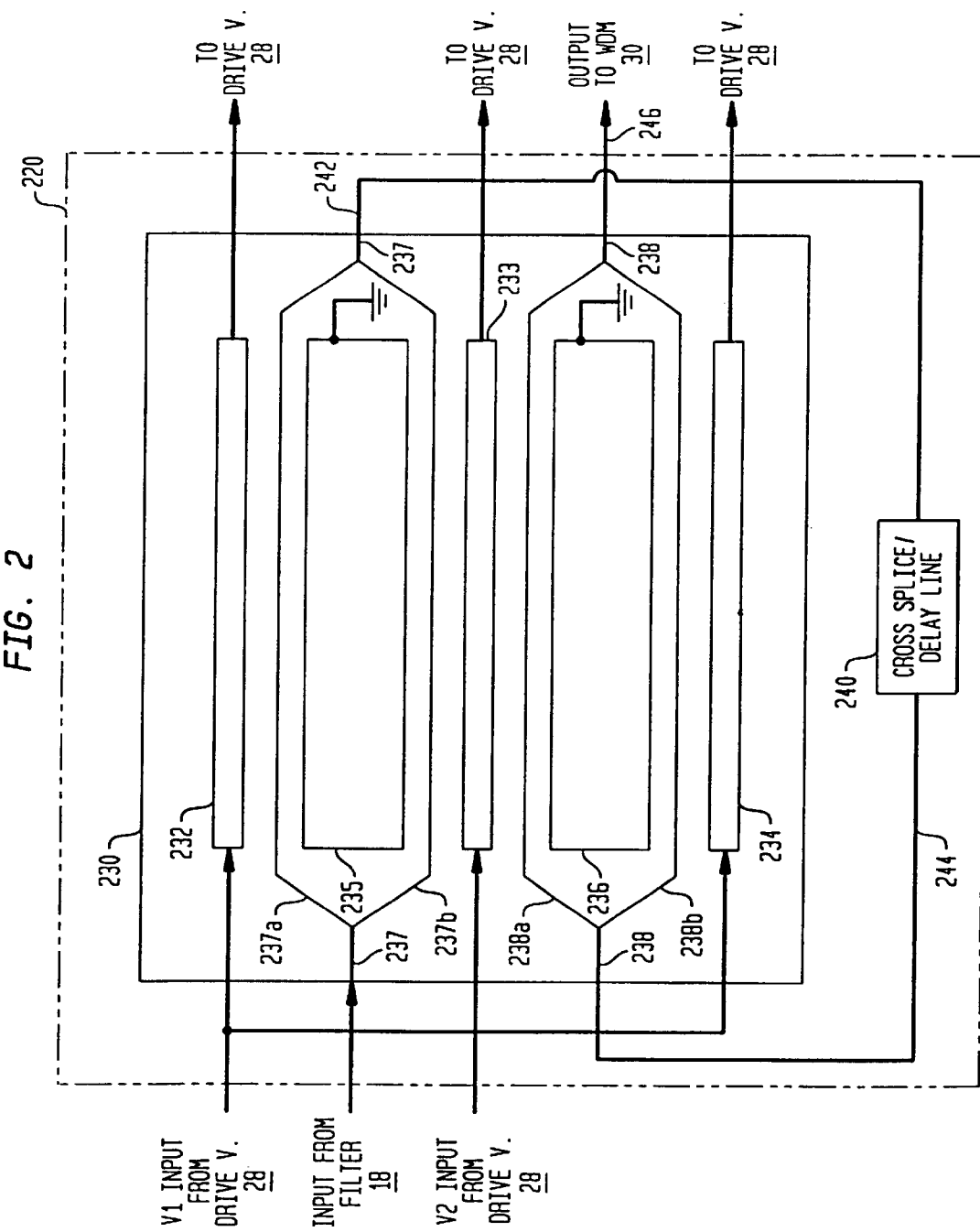
FIG. 2 shows a schematic layout of another exemplary polarization independent amplitude/phase modulator for use in the regenerator of FIG. 1 in accordance with the present invention.

Referring now to FIG. 2, there is shown a schematic layout of an exemplary polarization independent amplitude/phase modulator 220 which can be used as the modulator 20 in the polarization-independent all-optical regenerator 10 of FIG. 1 in accordance with a second embodiment of the present invention. The polarization independent amplitude/phase modulator 220 comprises a cross splice/delay line device 240, and a Lithium Niobate substrate 230 comprising a first electrically conductive electrode 232, a second electrically conductive electrode 233, a third electrically conductive electrode 234, a fourth electrically conductive electrode 235, a fifth electrically conductive electrode 236, a first Lithium Niobate waveguide 237 having two parallel branches 237a and 237b, and a second Lithium Niobate waveguide 238 having two parallel branches 238a and 238b. The first Lithium Niobate waveguide 237 is coupled at one end to the output of the optical filter 18 of FIG. 1, and has its first branch 237a located between, and parallel to, the first and fourth electrodes 232 and 235, while the second branch 237b is located between, and parallel to, the second and fourth electrodes 233 and 235. Each of the first and second branches 237a and 237b are combined into a single optical waveguide after passing the end of the adjacent electrodes 232, 233, and 235. The single optical waveguide 237 is then coupled to an input of the cross splice/delay line device 240 via a first polarization maintaining optical fiber 242.

The second Lithium Niobate waveguide 238 is coupled at one end to an output from the cross splice/delay line device 240 via a second polarization maintaining optical fiber 244. The second waveguide 238 has its first branch 238a located between, and parallel to, the second and fifth electrodes 233 and 236, while the second branch 238b thereof is located between, and parallel to, the third and fifth electrodes 234 and 236. Each of the first and second branches 238a and 238b are combined into a single optical waveguide after passing the end of the adjacent electrodes 233, 234, and 236. The single optical waveguide 238 is then coupled via an optical fiber to a predetermined input of the WDM 30 of FIG. 1. The fourth and fifth electrodes 235 and 236 are coupled to ground potential. The first and third electrodes 232 and 234 are electrically coupled at one end thereof to receive a first input voltage (V1) from the drive voltage circuit 28 shown in FIG. 1. The second electrode 233 is electrically coupled at one end thereof to receive a second input voltage (V2) from the drive voltage circuit 28 shown in FIG. 1. The other ends of the first, second, and third electrodes 232, 233, and 234 are coupled to a return lead to the drive voltage circuit to complete the circuit. It is to be understood that there may be different arrangements of the electrodes (e.g., 232, 233, 234, 235, and 236) for different requirements, without changing the basic concepts of the present invention.

The electrodes 232, 233, and 235 in relationship to the branches 237a and 237b of the Lithium Niobate waveguide 237, and the electrodes 233, 234, and 236 in relationship to the branches 238a and 238b of the Lithium Niobate waveguide 238, operate as follows. The V1 input from the drive voltage circuit 28 causes a travelling wave to propagate in the electrodes 232 and 234, which causes both predetermined phase and amplitude changes in optical signal propagating in the optical waveguide branches 237a and 238b due to the electro-optic response of Lithium Niobate crystals therein. Similarly, the V2 input from the drive voltage circuit 28 causes a travelling wave to propagate in the electrode 233, which causes both predetermined phase and amplitude changes in the optical signal propagating in the optical waveguide branches 237b and 238a due to the electro-optic response of Lithium Niobate crystals therein. When the branches 237a and 237b, and the branches 238a and 238b, are combined to form the output from optical waveguides 237 and 238, respectively, the input optical signal from the filter 18 (shown in FIG. 1) is both amplitude and phase modulated and provided as an output to the WDD 30 (shown in FIG. 1).

In operation, the input of the first optical waveguide 237 is coupled to a single mode optical fiber from the optical filter 18 of FIG. 1 so that both TE and TM modes can be coupled into the first optical waveguide 237 without introducing mode coupling.

The fourth and fifth electrodes 235 and 236 are placed at a reference potential (e.g., ground), while the first and third electrodes 232 and 234 have a travelling wave running from left to right caused by the driving voltage (V1) from the drive voltage circuit 28 of FIG. 1. Similarly, the second electrode 233 has a travelling wave running from left to right caused by the driving voltage (V2) from the drive voltage circuit 28 of FIG. 1. The travelling waves produced by the driving voltages V1 and V2 in the first and second electrodes 232 and 233, respectively, co-propagate with the optical signals propagating in the respective first and second branches 237a and 237b and modifies the phase and amplitude of the optical field due to an electro-optic response of Lithium Niobate crystals. Similarly, The travelling waves produced by the driving voltages V1 and V2 in the second and third electrodes 233 and 234, respectively, co-propagate with the optical signals propagating in the respective first and second branches 238a and 238b and modifies the phase and amplitude of the optical field therein. In general, the input optical field to the first and second optical waveguides 237 and 238 consists to-two orthogonal polarizations (TE and TM modes). Although both components of the two orthogonal polarizations experience phase and amplitude modulation generated by the travelling electric waves in the first, second, and third electrodes 232, 233, and 234, the modulation depths of the TE and TM modes are very different due to the asymmetric electro-optic responses of the Lithium Niobate crystals.

In order to compensate for the polarization dependence, a first and second polarization maintaining optical fibers 242 and 244 are used to route the output of the first optical waveguide 237 to the input of the second optical waveguide 238 via the cross splice/delay line device 240. In the cross splice/delay line device 240, the first and second polarization maintaining optical fibers 242 and 244 are coupled together with the axes rotated 90 degrees with respect to each other. As a result, the TE and TM modes are rotated 90 degrees at the input of the second optical waveguide 238. After passing through the branches 238a and 238b of the second optical waveguide 238, which is driven by the travelling electric waves occurring in the second and third electrodes 233 and 234, the two polarization components (TE and TM modes) experience the same amount of phase modulation. The output of the second optical waveguide 238 is coupled to a single mode optical fiber 246 which is coupled to the predetermined input of the WDM 30 of FIG. 1.

When the modulation speed in the modulator 220 is smaller than the transverse time of the optical signal, the first and second polarization maintaining optical fibers 242 and 244 can be simply spliced together. Otherwise, a tunable delay line should be used to match the phases of the optical field and the driving electric signal (V1n). This is very important for high speed periodic phase modulators. The lengths of the first and second polarization maintaining optical fibers 242 and 244 should be matched as close as possible so that there is no significant group delay between the TE and TM components. A delay line (not shown) in the cross splice/delay line device 240 is adjusted in such a way that the optical field is in phase with the electrical field at the input of the second optical waveguide 238. The delay line in the cross splice/delay line device 240 can be, for example, an all-fiber type such as a fiber stretcher controlled by a well-known piezo drum with the fiber wound on it, or simply mechanical in free space.

To use the arrangement of modulator 220 in synchronous all-optical regeneration, it is better to use a push-pull configuration. Since it is possible to perform amplitude and phase modulation simultaneously, there is no need to cascade a separate phase modulator after an amplitude modulator. To achieve the push-pull configuration, the input voltages V1 and V2 should be values given by the expression:

$V1,2=V0(t) \pm V(t)$, where t is time, and both V0 and V have the same waveform as the clock signal from the clock recovery circuit 24 of FIG. 1. The voltage V0 is responsible for phase modulation, while the voltage V is the push-pull amplitude, which is responsible for amplitude modulation. The phase difference between V0 and V can be zero or 180 degrees depending on the desired sign of "chirp". "Chirp" indicates that the frequency across a pulse is not uniform because of frequency changes over time across the pulse. For example, when a pulse is launched through a chromatic dispersant element such as an optical fiber, the pulse becomes chirped because the lower frequency portion moves faster when compared to the higher frequency portion. Therefore, the leading edge of the pulse has a lower frequency than the trailing edge of the pulse, which is referred to as a "chirp".

Figure 3:
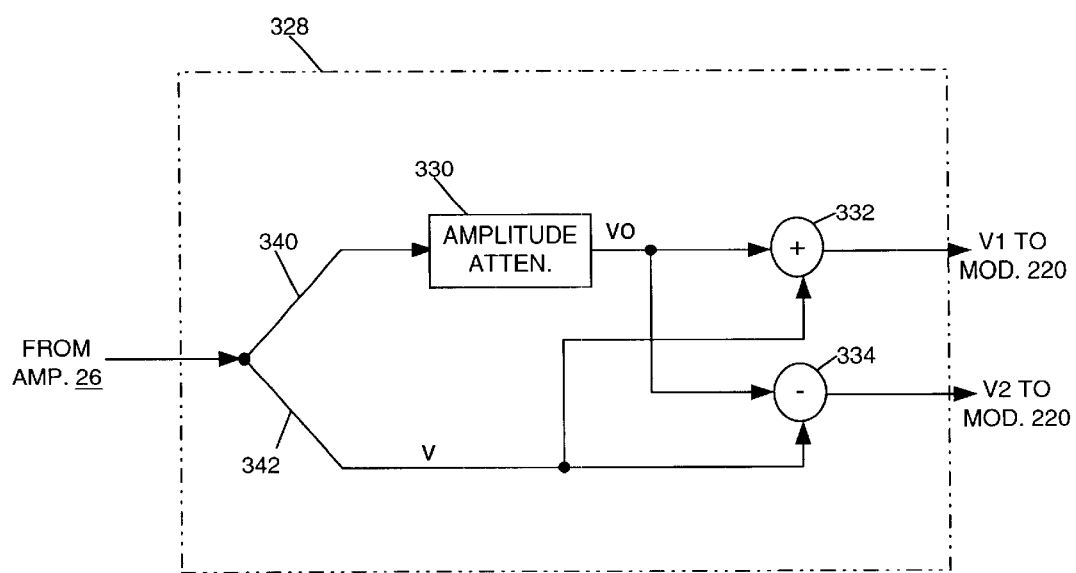
FIG. 3 shows a schematic of drive voltage circuitry to achieve push-pull modulation in the regenerator of FIG. 1 using the amplitude/phase modulator of FIG. 2 in accordance with the present invention.

Referring now to FIG. 3, there is shown a schematic of a drive voltage circuit 328 (shown within a dashed line rectangle) which can be used as the drive voltage circuit 28 in the regenerator 10 of FIG. 1 to achieve push-pull modulation when using the amplitude/phase modulator 220 of FIG. 2 in accordance with the present invention. The drive voltage circuit 328 comprises an amplitude attenuator (AMPLITUDE ATTEN.) 330, an adder circuit (+) 332, and a subtraction circuit (−) 334. In the driving voltage circuit 328, an amplified electrical clock signal is received from the amplifier 26 (shown in FIG. 1) and is split into first and second electrical paths 340 and 342. The portion of the clock signal in first path 340 has its amplitude attenuated by the amplitude attenuator 330 to generate an output signal voltage V0, while the portion of the clock signal in the second path 342 has a signal voltage V. The signal voltage V0 is provided as a first input to each of the adder circuit 332 and the subtraction circuit 334, while the signal voltage V is provided as a second input to each of the adder circuit 332 and the subtraction circuit 334. The adder circuit 332 adds the V and V0 signals to generate a V1 output signal which is coupled to the modulator 220 of FIG. 2, while the subtraction circuit subtracts V and V0 to generate the V2 output signal which is coupled to the modulator 220 of FIG. 2. Each of the V1 and V2 signals are generated by the adder circuit 332 and subtraction circuit 334, respectively, include a predetermined phase delay necessary for the push-pull operation of the modulator 220 of FIG. 2.

In the driving voltage circuit 328 of FIG. 3, the recovered clock signal is split into the two branches 340 and 342. The amplitude attenuator 330 in the branch 340 generates an output signal V0 which is an attenuated version of the recovered clock signal and is ultimately responsible for phase modulation in the modulator 220 of FIG. 2. The signal V propagating in the branch 342 corresponds to the recovered clock signal and is ultimately responsible for the push-pull amplitude modulation in the modulator 220 of FIG. 2. The adder circuit 332 receives both of the clock signals V and V0, and adds the two received signals to generate the output signal V1=V0+V which is provided to the modulator 220 of FIG. 2. The subtraction circuit 334 subtracts the signal V on branch 342 from the V0 signal at the output of the amplitude attenuator 330 to generate the signal V2=V0−V which is provided to the modulator 220 of FIG. 2. It is to be understood that the signals V, V0, V1, and V2 all have the same waveform and are in phase, but have different amplitudes due to the operations of the amplitude attenuator 330, the adder circuit 332, and the subtraction circuit 334. For an understanding of the responsibilities indicated for the V0 and V signals, if, for example, only the signal V0 from the amplitude attenuator 330 were provided as inputs to the adder circuit 332 and the subtraction circuit 334, then the output of the adder circuit 332 and the subtraction circuit 334 would be the exact same signal (+V0) and provided as the signals V1 and V2. This same signal would be applied to the first, second, and third electrodes 232, 233, and 234 of the modulator 220 of FIG. 2 and only cause a phase modulation to occur in the waveguide branches 237a, 237b, 238a, and 238b. However, if, for example, only the signal V in the branch 342 were provided as an input to the adder circuit 332 and the subtraction circuit 334, then the output signal V1 from the adder circuit 332 would correspond to a positive V signal (+V), while the output signal V2 from the subtraction circuit 334 would correspond to a negative V signal (−V). Under this condition, the signals +V and −V are out of phase and form portions of the signals V1 and V2, respectively, when combined with V0 in the respective adder circuit 332 and the subtraction circuit 334. Therefore, when the V1 signal (+V portion) is applied to the electrodes 232 and 234 of the modulator 220 of FIG. 2, and the V2 signal (−V portion) is applied to the electrode 233 of the modulator 220 of FIG. 2, the two signals (+V and −V) cause a push-pull amplitude modulation in the lithium niobate waveguide branches 237a and 237b, and in the lithium niobate waveguide branches 238a and 238b. More particularly, in the lithium niobate optical waveguide 237 shown in FIG. 2, the first branch 237a is affected by V1 being applied Qtera 1 to the first electrode 232 which includes the +V portion therein, while the second branch 237b is affected by V2 being applied to the second electrode 233 which includes the −V portion therein. Both V1 and V2 have a common voltage V0 which is responsible for causing a predetermined phase modulation in the optical channel signal received from the filter 18 of FIG. 1 when passing through waveguides 237 and 238. However, the difference between V1 and V2 is the inclusion of +V and −V, respectively, which drive the modulator 220 as a push-pull device, where branch 237a is pushed by the +V portion of V1, and branch 237b is pulled by the−V portion of V1.

The polarization independent modulator 220 is a key component of the synchronous all-optical regenerator 10 of FIG. 1, since the modulator 220 of FIG. 2 provides polarization independence, high speed, low insertion loss, low driving voltages, good reliability, and ease of manufacture. The modulator 220 performs re-shaping of the input signal pulse, where the periodic amplitude modulation reshapes the optical pulses since pulse distortion outside the clock pulses will be chopped off. The modulator 220 also performs re-timing, where timing-jitter is corrected by the periodic amplitude modulation. Still further, the synchronous amplitude modulation helps to improve signal-to-noise ratio, since the noise located in between clock pulses will be substantially eliminated. Phase modulation generates frequency chirp, which can be used to control timing jitter as well as pulse distortion.

It is to be appreciated and understood that the specific embodiments of the present invention described hereinbefore are merely illustrative of the general principles of the invention. Various modifications may be made by those skilled in the art which are consistent with the principles set forth.

What is claimed is:
1. An optical regenerator comprising:
   a first path for processing a demultiplexed optical channel signal of an optical input signal comprising N wavelength division multiplexed channel signals received by the regenerator, the first path comprising:
      clock recovery means responsive to the demultiplexed optical channel signal for generating an electrical clock signal having a frequency corresponding to a bit rate frequency of the demultiplexed optical channel signal, the electrical clock signal being used to generate at least one electrical driving voltage signal; and an optical modulator comprising at least three electrodes and first and second Lithium niobate optical waveguides interspersed between the at least three electrodes, the optical modulator being responsive to both the demultiplexed optical channel signal and the at least one electrical driving voltage signal from the clock recovery means for generating a regenerated optical output channel signal which is polarization independent.

2. The optical regenerator of claim 1 wherein:

a first end of the first Lithium niobate optical waveguide is coupled to receive the demultiplexed optical channel signal; and the modulator further comprises cross splice/delay line means for interconnecting a second end of the first Lithium niobate optical waveguide to a first end of the second Lithium niobate optical waveguide, the cross splice/delay line means introducing a predetermined rotation of TE and TM modes in the optical channel signal so that polarization components at a second end of the second Lithium niobate optical waveguide experience a same amount of phase modulation.

3. The optical regenerator of claim 2 wherein the cross splice/delay line means is coupled to the second end of the first Lithium niobate optical waveguide and to the first end of the second Lithium niobate optical waveguide with first and second polarization maintaining optical fibers, respectively.

4. The optical regenerator of claim 1 further comprising:

a wavelength division demultiplexer (WDD) responsive to the reception of the optical input signal comprising N wavelength division multiplexed channel signals for directing each demultiplexed optical channel signal onto a separate one of the first path and N-1 remaining optical paths; and a wavelength division multiplexer (WDM) responsive to a reception of each of the N optical output signals from optical modulators in each of the first path and the N-1 remaining optical paths for generating an optical output signal comprising N wavelength division multiplexed channel signals for transmission over a single optical output fiber of the regenerator.

5. The optical regenerator of claim 4 wherein each of the N-1 remaining optical paths between the WDD and WDM comprises:

clock recovery means responsive to the associated demultiplexed optical channel signal for generating an electrical clock signal having a frequency corresponding to a bit rate frequency of the demultiplexed optical channel signal, the electrical clock signal being used to generate at least one electrical driving voltage signal; and an optical modulator comprising at least three electrodes and first and second Lithium niobate optical waveguides interspersed between the at least three electrodes, the optical modulator being responsive to both the associated demultiplexed optical channel signal and the at least one electrical driving voltage signal from the clock recovery means for generating a regenerated optical output channel signal which is polarization independent.

6. The optical regenerator of claim 1 wherein the modulator comprises:

a substrate;

first, second, third, fourth, and fifth electrically conductive electrodes formed substantially parallel to each other on the substrate, the second and fourth electrodes being coupled to a predetermined fixed potential, the first and fifth electrodes being coupled to receive a first electrical driving voltage signal from the clock recovery means to form a travelling wave therealong, and the third electrode being coupled to receive a second electrical driving voltage signal from the clock recovery means to form a travelling wave therealong;

first and second Lithium niobate optical waveguides formed on the substrate and oriented substantially parallel to each other, the first Lithium niobate optical waveguide being coupled at a first end thereof to receive the demultiplexed optical channel signal and is then divided into first and second optical paths which extend between the first and second electrodes and the second and third electrodes, respectively, before being coupled together at a second end thereof, and the second Lithium niobate optical waveguide is divided at a first end thereof into first and second optical paths which extend between the third and fourth electrodes and the fourth and fifth electrodes, respectively, before being coupled together at a second end thereof to form the optical output channel signal from the regenerator; and cross splice/delay line means for interconnecting the second end of the first Lithium niobate optical waveguide to the first end of the second Lithium niobate optical waveguide, the cross splice/delay line means introducing a predetermined rotation of TE and TM modes so that polarization components at the second end of the second Lithium niobate optical waveguide experience a same amount of phase modulation.

7. The optical regenerator of claim 6 wherein the cross splice/delay line means is coupled to the second end of the first Lithium niobate optical waveguide and to the first end of the second Lithium niobate optical waveguide with first and second polarization maintaining optical fibers, respectively.

8. The optical regenerator of claim 6 wherein the clock recovery means comprises a driving voltage means comprising:

an amplitude attenuation means for attenuating the amplitude of a recovered clock signal by a predetermined amount and generating an output signal that is responsible for phase modulation in the modulator;

an adder for adding the output signal from the amplitude attenuation means, and the recovered clock signal which generating the first electrical driving voltage signal used by the modulator; and a subtraction means for subtracting the output signal from the amplitude attenuation means and the recovered clock signal for generating the second electrical driving voltage signal used by the modulator.

9. An optical regenerator for use in an optical transmission system comprising:

a wavelength division demultiplexer (WDD) responsive to the reception of an optical input signal comprising N wavelength division multiplexed channel signals for directing each demultiplexed optical channel signal onto a separate one of N optical output paths;

a separate clock recovery means coupled in each of the N optical output paths of the WDD which is responsive to the demultiplexed optical channel signal directed onto the optical output path from the WDD for generating an electrical recovered clock signal having a frequency corresponding to a bit rate frequency of the demultiplexed optical channel signal which is used to generate at least one electrical driving voltage signal;

a separate optical modulator coupled in each of the N optical output paths of the WDD comprising at least two electrodes and at least two Lithium niobate optical waveguides, the optical modulator being responsive to both the demultiplexed optical channel signal directed onto the optical output path from the WDD and the at least one electrical driving voltage signal from the clock recovery means for generating a regenerated optical output signal which is polarization independent; and a wavelength division multiplexer (WDM) responsive to the reception of each of the regenerated optical output signals from the optical modulators in the N optical paths for generating an optical output signal comprising N wavelength division multiplexed channel signals for transmission over a single optical output fiber of the regenerator.

10. The optical regenerator of claim 9 wherein each modulator comprises:

a substrate;

first, second, third, fourth, and fifth electrically conductive electrodes formed substantially parallel to each other on the substrate, the second and fourth electrodes being coupled to a predetermined fixed potential, the first and fifth electrodes being coupled to receive a first electrical driving voltage signal from the clock recovery means to form a travelling wave therealong, and the third electrode being coupled to receive a second electrical driving voltage signal from the clock recovery means to form a travelling wave therealong;

first and second Lithium niobate optical waveguides formed on the substrate and oriented substantially parallel to each other, the first Lithium niobate optical waveguide being coupled at a first end thereof to the demultiplexed optical channel signal and then divided into first and second paths which extend between the first and second electrodes and the second and third electrodes, respectively, before being coupled together at a second end thereof, and the second Lithium niobate optical waveguide is divided at a first end thereof into first and second paths which extend between the third and fourth electrodes and the fourth and fifth electrodes, respectively, before being coupled together at a second end thereof and then coupled to provide a separate input signal to the WDM; and cross splice/delay line means for interconnecting the second end of the first Lithium niobate optical waveguide to the first end of the second Lithium niobate optical waveguide, the cross splice/delay line means introducing a predetermined rotation of TE and TM modes so that polarization components at the second end of the second Lithium niobate optical waveguide experience a same amount of phase modulation.

11. The optical regenerator of claim 10 wherein the cross splice/delay line means is coupled to the second end of the first Lithium niobate optical waveguide and to the first end of the second Lithium niobate optical waveguide with first and second polarization maintaining optical fibers, respectively.

12. The optical regenerator of claim 10 wherein the clock recovery means comprises a driving voltage means comprising:

an amplitude attenuation means for attenuating the amplitude of a received recovered clock signal by a predetermined amount and for generating an electrical output signal that is responsible for phase modulation;

an adder for adding the received recovered clock signal which is responsible for a push-pull amplitude, and the output signal from the amplitude attenuation means, and generating the first electrical driving voltage signal used by the modulator; and a subtraction circuit for subtracting the output signal from the amplitude attenuation means and the received recovered clock signal for generating the second electrical driving voltage signal used by the modulator.

* * * * *